UNITED STATES PATENT OFFICE.

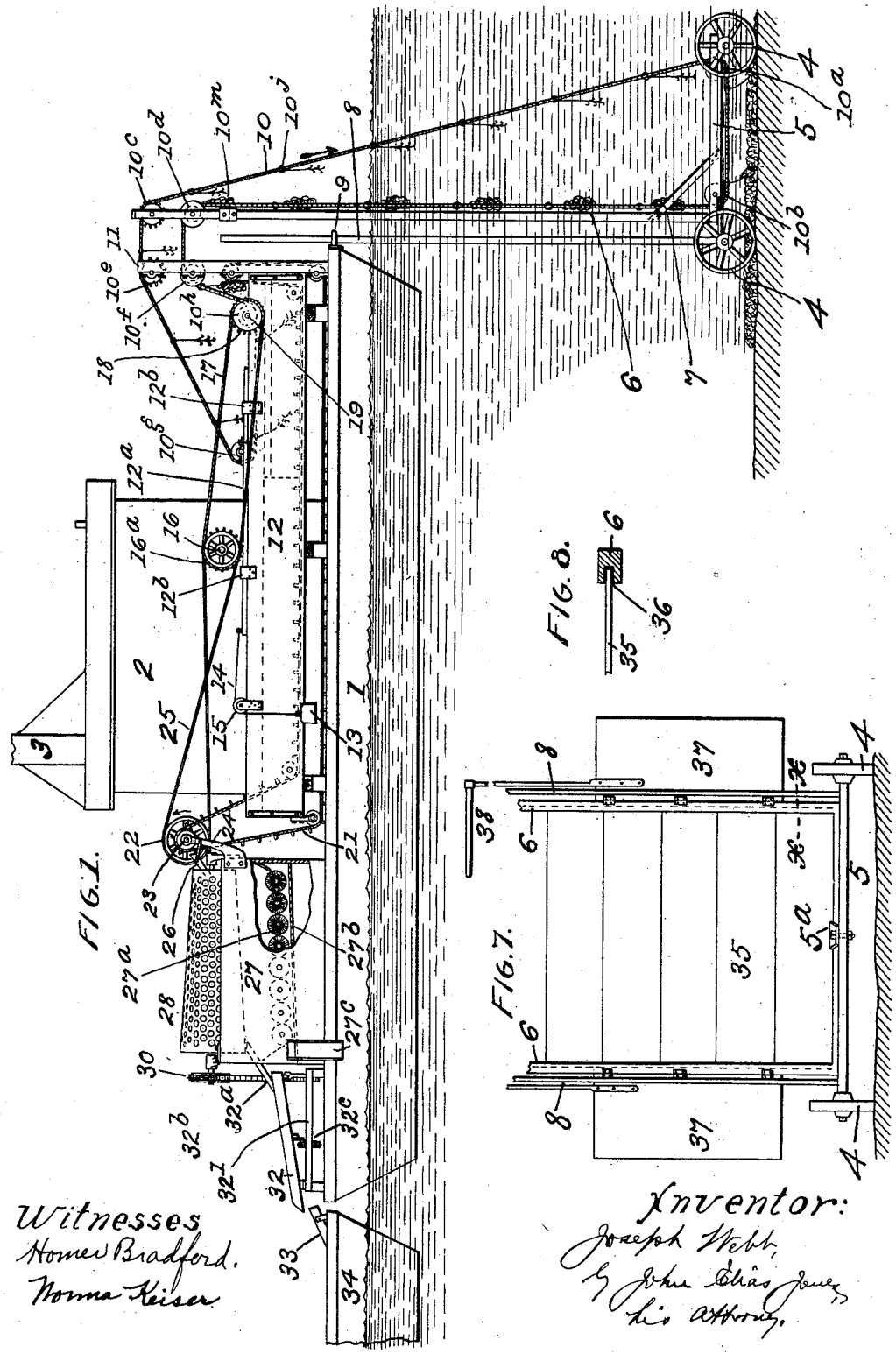

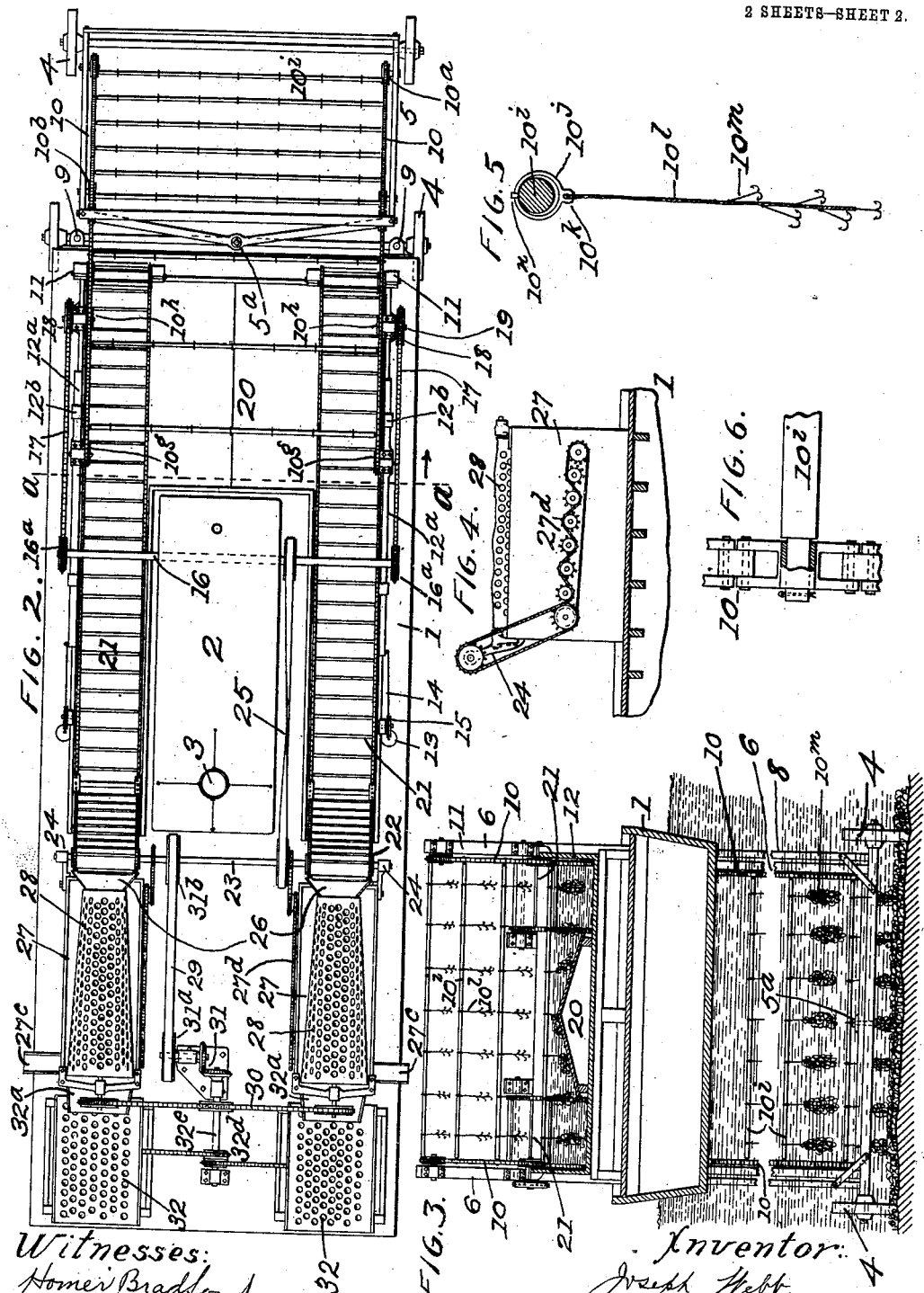

JOSEPH WEBB, OF CINCINNATI, OHIO, ASSIGNOR TO THE BIVALVE COMPANY, OF CINCINNATI, OHIO, A CORPORATION OF OHIO.

MUSSEL-DREDGE AND SEPARATING APPARATUS.

978,968.  Specification of Letters Patent.  Patented Dec. 20, 1910.

Application filed December 12, 1908. Serial No. 467,307.

*To all whom it may concern:*

Be it known that I, JOSEPH WEBB, a subject of the King of Great Britain, and a resident of Cincinnati, in the county of Hamilton and State of Ohio, have invented certain new and useful Improvements in Mussel-Dredges and Separating Apparatus, of which the following is a specification.

This invention relates to devices or apparatus used in the raising of mussels or the like from the bottoms or beds of streams and bodies of water and then causing the opening of the shells of such mussels, to be followed by the separation or releasing of the mussels from the shells and any pearls or slugs that may be contained in the shells with the mussels.

The object of the invention is to provide continuous means comprising a trestle or traveler partly submerged within said stream or body of water and having a grapple-elevator whereby the mussels can be gathered from the bed or bottom of the body of water, then elevated to a barge or float provided with grapple-releasing and shell-opening means, means for separating the mussels from the now open shells, means for carrying the shells and mussels in both united and separated conditions through the mechanism on the barge and discharging the separated load of shells in a receptacle independent of that into which the mussel meat is deposited, and, also, independent of that into which the pearls, slugs and other like extraneous matter contained in the shells are deposited.

The invention consists in the combination of a barge or float, gathering and elevating means applied to one end of said barge, a tank containing a shell-opening mixture or chemical solution, a carrier, a rotary grading-screen, a series of rotary brushes mounted and operating beneath said rotary grading-screen, an auxiliary shaker-screen immediately following said rotary grading-screen and driving means for operating all of said devices or elements in unison, whereby mussels or other like bivalves are gathered from the bed of a stream or other body of water, elevated to said barge or float, the shells then caused to open, the mussels and shells then separated from each other and suitably deposited independent of each other for market, use and waste as the case may be.

The essential features of the invention will be fully described hereinafter and referred to in detail and, also, more particularly pointed out in the several claims.

In the several sheets of drawings accompanying this description, Figure 1 is a longitudinal elevation partly broken and in section, showing my improved apparatus as it appears in use; Fig. 2, a plan view of the same; Fig. 3, a transverse, sectional elevation taken on the dotted line a, a, of Fig. 2; Fig. 4, a fragmentary elevation showing the outside of the compartment containing the wire brushes or rotary devices for use in separating the pearls and slugs from the mussel meat after the latter has been separated from the shells in the rotary grading-screen above, also showing a portion of said rotary grading-screen and a cross-section of the supporting-timbers forming part of the barge; Fig. 5, a detail view of one of the sets or gangs of grapple-hooks used in catching and elevating the mussels, and showing the loose-ring connection mounted on one of the transverse-bars of the elevating device, said transverse-bar being shown in cross-section; Fig. 6, a fragmentary plan view, partly in section, showing several of the links and one of the cross-bars of the carrier device; Fig. 7, a rear elevation of the elevator-trestle in its preferred form, showing a pair of lateral wings or blades pivotally-attached to the side uprights of the trestle and adapted to be thrown outward, independently, for guiding the apparatus in its forward movements in a running stream of water, a vertical series of boards forming buckets being shown removably-held in said uprights for the impingement or propelling force of the current; and Fig. 8, a fragmentary, sectional plan taken on the dotted line x, x, of Fig. 7, but on a larger scale to show the upright and bucket construction only.

In these views, 1 indicates a barge or float of any suitable construction, carrying amidships any suitable engine or power device 2, the latter not being shown in detail but merely represented by a rectangular figure and supplied with a smoke-stack 3.

An elevator-trestle is provided at the rear of the barge and is mounted on four wheels 4, the frame of the trestle being composed of a rectangular, horizontal frame 5 at its base and a pair of uprights 6, 6, one upright at either fore corner of said base 5, braced at 7.

A pair of upright rods 8, 8 extends from the fore end of the base 5 of the elevator-trestle and freely engages horizontal eyes 9, 9 extending from the rear end of the barge 1 and adapting the elevator-trestle to variations in the bed of the stream or different depths of water. The presence of the rods 8 and eyes 9 and a central fifth-wheel $5^a$ furnishes a coupling-engagement between the barge and the elevator-trestle that duly compensates for variations in the depth of the stream and is an important feature of the invention herein.

10 indicates each one of a pair of endless chains traveling, a suitable distance apart, over sprocket-wheels $10^a$, $10^b$ (at the bottom of the elevator-trestle), $10^c$, $10^d$ (at the upper end of the elevator-trestle), $10^e$, $10^f$ (at the upper ends of an upright frame 11 at the rear end of the barge 1) and $10^g$, $10^h$, supported by the side-members of a tank 12 containing a solution that is adapted to cause the mussels to promptly throw open their shells in the passage of the bivalves through my device. The bearings of the sprocket-wheels $10^g$, either side the tank 12, are mounted on slides $12^a$ that freely reciprocate in guides $12^b$, $12^b$ and are provided with weights 13 hung from ropes 14 that engage grooved wheels 15 on the said side-members of the tank 12. These sliding bearings $10^g$ are adapted to make due allowance for the slack in the chain occasioned by the rise and fall of the elevator-trestle along the variable bottom of the stream and thus compensate for said variable bottom or bed, which is necessary in the practical use of my device.

16 indicates the horizontal driving-shaft of the engine or power device 2, carrying at its opposite ends sprocket-wheels $16^a$, $16^a$ that engage and carry the drive-chains 17, 17, such chains also engaging sprocket-wheels 18, 18 mounted on said side-members of the tank 12 and whose short shafts 19, also carry the said sprocket-wheels $10^h$, $10^h$, for driving the chains 10, 10.

$10^i$ indicates each one of a series of transverse-bars or rods carried, at a suitable distance apart, by the chains 10, and $10^j$ a series of loosely-mounted rings on each of said bars $10^i$, each ring $10^j$ having an eye $10^k$ from which is suspended a short drag-line $10^l$, the latter carrying a number of grapple-hooks $10^m$ at its lower portion. The weight of the grapple-hooks and drag-lines on the rings $10^j$ is sufficient to cause the rings to freely engage the transverse-bars $10^i$ with the eyes $10^k$ extending downwardly, as best seen in Fig. 5, the short upright pins $10^n$ at either side of the several rings $10^j$ duly preventing the latter moving lengthwise on the transverse-bars $10^i$ and thus avoiding the massing and entangling of the drag-lines and hooks at any particular point along said transverse-bars $10^i$.

The tank 12 comprises a suitable vat, as above stated, for containing a solution adapted to open the shells of the bivalves and is formed at its rear portion, which extends the entire width of the device, with a bottom that slopes from a raised center downwardly toward the forwardly-extended side passages of the tank, as best shown at 20 in Figs. 2 and 3.

The forwardly-extending parts or pools of the tank 12 have the power device 2 arranged between them, as best seen in Fig. 2, and carriers 21, 21 are mounted on and suitably engage sprocket-wheels provided on the tank, such carriers extending upwardly at their rear portions and engaging sprockets 22 mounted on the transverse shaft 23, the latter mounted at its opposite ends in bracket-bearings 24, 24. A cross-belt 25 engages over pulleys on the shaft 23 and the drive-shaft 16, as best seen in Fig. 2, and inclined chutes 26 are provided on the rear ends of boxes or receptacles 27 near the fore end of the barge. The upper ends of said chutes 26 are arranged to receive the open mussel shells and the mussels therewith and are adapted to convey them into the open rear end of a conical rotary grading-screen 28 journaled in the open top of the said box or receptacle 27 and having driving mechanism connected by a straight belt 29 with the shaft 23, such driving-mechanism comprising sprocket-wheels at the fore ends of the rotary grading-screen shafts, transverse drive-chain 30, bevel-gears 31 and pulleys $31^a$ and $31^b$, as best seen in Fig. 2.

The boxes or receptacles 27 are each provided with a series of steel wire brushes $27^a$ rotating therein and adapted to move the mussel meat and other siftings from the graders 28 along an inclined screen-bottom $27^b$ toward the delivery-spouts $27^c$, extending laterally at the fore ends of said box or receptacle 27 and discharging into the water at either side of the barge. The screen $27^b$ is of a suitable mesh to allow only the pearls and slugs, or like small matter, to pass therethrough, the meat of the mussel alone passing along the screen to the discharge-spout $27^c$.

An auxiliary, inclined tray 32, having a perforated bottom is provided at the fore end of each of the grading-screens 28, a chute $32^a$ leading from the fore end of each grading-screen to each auxiliary-screen to convey the shells to feed forward through the larger, open fore end of each rotary-screen upon the perforated downwardly-inclined auxiliary-screen 32, the latter allowing any small particles still remaining among the shells to pass therethrough and said shells to pass thereover upon the chute 33 at the fore end of a receiving boat or receptacle 34, as best seen in Fig. 1. The auxiliary trays or screens 32 are each mounted on a frame $32^l$ at the rear end of the barge 1 and in a vibratory manner, as seen at 32^b, a vibrating device 32^c connected by sprocket devices 32^d, which, in turn, are actuated by shaft 32^e that is driven by the miter-gear 31.

The series of steel wire brushes 27^a in the boxes or receptacles 27 are driven by a series of sprocket-wheel devices 27^d, as best seen in Fig. 4, so as to have the proper propelling power for moving the mussel meat forward and separating the pearls and slugs therefrom and so that the latter matters pass through the screen 27^d into a suitable receptacle provided below.

In order to propel the device along a running stream of water, when it is desired to use the current for such propulsion, I provide a series of transverse boards or bars 35, whose ends engage guide-ways 36 in the uprights 6 of the elevator-trestle, the number of boards used in vertical broadside array depending upon the depth of the stream, it requiring less boards, as a matter of course, to propel the device along a shallow stream than along a deep one. The boards 35 can be readily applied in the guide-ways to suit the depth of the stream, as is obvious, and other power can be used as well in connection with the movement of the device either up or down stream.

In order to guide the device in a very convenient manner, I provide at either side of the uprights 6, a swinging wing or blade 37 provided with an operating-handle 38. These swinging wings or blades are projected laterally, in turn, to suit the direction that the device shall travel in the stream, only one of the wings or blades being used at a time, the one on the right side (looking toward the fore end of the device) being used to direct the bolt to the right and the other wing being used to direct the device to the left, owing to the resistance offered at either side of the device in traveling under the propulsive power of the current against the vertical series of boards 35 that practically form resistance buckets.

In the operation of my device, the mussels or bivalves feeding along the bottom or bed of a stream have their shells open to some extent for such feeding, and the traveling grapple-hooks readily enter between the open shells, at which time the mussels instantly close upon such hooks with the result that the said moving hooks carry such mussels along the elevator-trestle and into the vat containing the chemical solution, which latter enters the very slightly open shell of each mussel, occasioned by the presence of the hook therein and the mussel is at once affected by such solution to an extent sufficient to cause it to throw its shell wide open and to thereby release the hook. The gangs or clusters of hooks continue to pass downward and upward along the elevator-trestle for the further gathering and discharging of the mussels into said vat. The discharging of the mussels in the vat is partly effected in the central portion of the vat, which is provided with a bottom that inclines sidewise from a raised center toward the side-carriers so that all the mussels are adapted to be delivered to the said carriers, which latter, in turn, deliver the mussels in their now open shells to the rotary grading-screens through which the shells pass onward to the shaker-trays and thence into a receiving boat or other suitable receptacle. As the shells are advancing in the rotary graders, the separated mussel meat and other matter smaller than the shells pass downward through the perforations in said rotary graders into chambers containing rotary steel wire brushes that are adapted to permit pearls, slugs and other like small matter to pass therethrough into a receiving-chamber below, the said mussel meat discharging at the fore end of each brush-chamber into the water at both sides of the barge or float, or elsewhere, as desired. The vibratory shaker-trays at the fore end of the barge are adapted to convey the shells onward to the receiving-boat or receptacle ahead and, also, to finally screen any pearls, slugs, or other small matter not already screened in the rotary graders, into a suitable receptacle below them at the fore end of the barge.

In the use of my process hereinbefore described and shown in the drawings, it is evident that the separation of the shells from the contents thereof is fully effected and such shells put in marketable condition. Such pearls and slugs, or other like small matter contained in bivalves are also fully separated from the meat and the shells and delivered into receptacles independent of said shells and of each other, which is important in the handling of bivalves, especially for the shells and pearls that form the marketable products.

I claim:—

1. A bivalve elevating and separating apparatus comprising an elevator-trestle, grapple-hooks endless carriers mounted on said elevator-trestle and adapted to carry said grapple-hooks, a barge or float to which said elevator-trestle is coupled, a vat containing a shell-opening solution, one or more carriers circulating through said vat and adapted to convey the open shells forward, a rotary grading-screen, a series of rotary brushes for separating the smaller particles strained by said rotary grader and means for actuating said grapple-hook, elevator, carrier, rotary-grader and brush devices.

2. An apparatus for gathering and separating bivalves, the same comprising a portable upright trestle carrying an elevator-chain armed with grapple-hooks, a barge or float to which said upright trestle is coupled so as to move in vertical as well as horizontal relation, a tank or vat containing a solution adapted to cause the opening of the shells of said bivalves, movable bearings on said tank adapted to carry the upper bights in the trestle elevator-chains and thereby provide for the variations in the depth of the water and the slack in said chains, carrier means in said tank for conveying the open shells with their contents therethrough, rotary grading-screens, rotary wire brushes beneath said grading-screens, fine wire meshes or screens beneath said rotary wire brushes, vibratory shaker-screens at the delivery ends of said rotary screens and means for driving said elevator mechanism, carrier mechanism, rotary grading-screens, rotary wire brushes and vibratory shaker-screens.

3. In a bivalve gathering and separating apparatus, a barge or float having guide-ways at its rear end, a grappling and elevating trestle having upright rods engaging said guide-ways on the barge or float, wheels on which said trestle is portably mounted, forwardly-advancing carrier devices on said barge or float, shell-opening means arranged in relation to the said forwardly-advancing carrier devices, screening devices arranged on said barge or float in front of the said forwardly-advancing carrier devices and means for transmitting power to said grappling, elevating, carrier and screening devices.

4. In a device of the character described, a grappling and elevating device comprising a pair of endless chains or belts, transverse rods or bars mounted in parallel array at suitable distances apart in said chains, rings loosely-mounted on said transverse rods or bars, eyes mounted on said rings, short drag-lines attached to said eyes and grappling-hooks carried by said drag-lines.

5. In a device of the character described, a barge or float, a portable grappling and elevating trestle variably-coupled to said barge or float at its rear end and provided with upright frame-bars having guide-ways along their inner edges and a vertical series of boards removably-mounted in said guide-ways.

6. In a device of the character described, a barge or float, a portable grappling and elevating trestle variably-coupled to the rear end of said barge or float, vertical guide-ways on said trestle, a vertical series of horizontal boards removably-mounted in said guide-ways, lateral wings or blades pivotally-mounted on said trestle, controlling means for opening and closing said wings in their operation as rudders for the apparatus in advancing it with the current of a running stream.

JOSEPH WEBB.

Witnesses:
   JOHN ELIAS JONES,
   NORMA KEISER.